United States Patent
Maehara

(10) Patent No.: US 10,471,778 B2
(45) Date of Patent: Nov. 12, 2019

(54) PNEUMATIC TIRE

(71) Applicant: SUMITOMO RUBBER INDUSTRIES, LTD., Kobe-shi, Hyogo (JP)

(72) Inventor: Atsushi Maehara, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 568 days.

(21) Appl. No.: 14/786,385

(22) PCT Filed: Feb. 27, 2014

(86) PCT No.: PCT/JP2014/054898
§ 371 (c)(1),
(2) Date: Oct. 22, 2015

(87) PCT Pub. No.: WO2014/185121
PCT Pub. Date: Nov. 20, 2014

(65) Prior Publication Data
US 2016/0082779 A1    Mar. 24, 2016

(30) Foreign Application Priority Data
May 13, 2013    (JP) ................................ 2013-101508

(51) Int. Cl.
| | | |
|---|---|---|
| *B60C 11/03* | (2006.01) | |
| *B60C 11/12* | (2006.01) | |
| *B60C 11/13* | (2006.01) | |

(52) U.S. Cl.
CPC ...... *B60C 11/0327* (2013.01); *B60C 11/0309* (2013.01); *B60C 11/1236* (2013.01);
(Continued)

(58) Field of Classification Search
CPC ............ B60C 11/1307; B60C 11/1309; B60C 2011/1209; B60C 2011/0388;
(Continued)

(56) References Cited

U.S. PATENT DOCUMENTS 5,137,068 A * 8/1992 Loidl ...................... B60C 11/11
152/209.27
2002/0092591 A1 * 7/2002 Cortes ................. B60C 11/0309
152/209.18
(Continued)

FOREIGN PATENT DOCUMENTS

EP    2 497 656 A1    9/2012
JP    58-177703 A  * 10/1983
(Continued)

OTHER PUBLICATIONS

Machine translation for Japan 58-177703 (Year: 2018).*
(Continued)

*Primary Examiner* — Steven D Maki
(74) *Attorney, Agent, or Firm* — Birch, Stewart, Kolasch & Birch, LLP

(57) ABSTRACT

To provide a pneumatic tire capable of improving the rolling performance, low noise performance and wear resistance performance while maintaining the wet performance.
It is a pneumatic tire (1) provided in the tread portion (2) with a plurality of main grooves (3). The main groove (3) has, in a cross-section perpendicular to the longitudinal direction of the groove, a first groove bottom (3A) and a pair of first groove walls (3B, 3B) extending smoothly from the first groove bottom (3A) to the tread surface (S). In the main groove (3), the width (W1) between the first groove walls (3B) is 2.0 to 20.0 mm at a tread surface (S), and the depth (D) from the tread surface (S) to the first groove bottom (3A) is 10.0 mm or more. In the first wall (3B), the ratio (W1/α) of the angle (α) [degree] with respect to a normal direction
(Continued)

to the tread surface (S) and the width (W1) [mm] is in a range of 1.0 to 2.0 [mm/degree].

17 Claims, 6 Drawing Sheets

(52) U.S. Cl.
CPC ...... B60C 11/1272 (2013.01); B60C 11/1307 (2013.01); *B60C 2011/036* (2013.01); *B60C 2011/0346* (2013.01); *B60C 2011/0348* (2013.01); *B60C 2011/0353* (2013.01); *B60C 2011/0365* (2013.01); *B60C 2011/0388* (2013.01); *B60C 2011/1209* (2013.01)

(58) Field of Classification Search
CPC ..... B60C 2011/0346; B60C 2011/0348; B60C 11/0309
See application file for complete search history.

(56) References Cited

U.S. PATENT DOCUMENTS

| | | | | |
|---|---|---|---|---|
| 2003/0102064 A1* | 6/2003 | Below | ................. | B60C 11/0309 |
| | | | | 152/209.18 |
| 2011/0226397 A1* | 9/2011 | Hamada | ................. | B60C 11/11 |
| | | | | 152/209.18 |
| 2011/0259494 A1* | 10/2011 | Shibano | ............. | B60C 11/0306 |
| | | | | 152/209.22 |
| 2012/0080130 A1* | 4/2012 | Scheuren | ............ | B60C 11/0306 |
| | | | | 152/209.22 |
| 2013/0098519 A1* | 4/2013 | Maehara | ............. | B60C 11/0306 |
| | | | | 152/209.22 |
| 2014/0238568 A1* | 8/2014 | Haga | ................... | B60C 11/0309 |
| | | | | 152/209.18 |
| 2016/0159158 A1* | 6/2016 | Washizuka | .......... | B60C 11/0306 |
| | | | | 152/209.8 |
| 2016/0297254 A1* | 10/2016 | Numata | ............. | B60C 11/0332 |

FOREIGN PATENT DOCUMENTS

| | | | |
|---|---|---|---|
| JP | 60-255506 A | * | 12/1985 |
| JP | 64-004502 A | * | 1/1989 |
| JP | 5-278414 A | | 10/1993 |
| JP | 7-232513 A | | 9/1995 |
| JP | 2007-137411 A | | 6/2007 |
| JP | 2009-18617 A | | 1/2008 |
| JP | 2012-20714 A | | 2/2012 |
| JP | 2012-183885 A | | 9/2012 |
| JP | 2012-218469 A | | 11/2012 |
| JP | 5134662 B2 | | 11/2012 |
| JP | 2015-027845 A | * | 2/2015 |
| WO | WO-2013-051053 A1 | * | 4/2013 |

OTHER PUBLICATIONS

Machine translation for Japan 64-004502 (Year: 2018).*
Machine translation for Japan 60-255506 (Year: 2018).*
Extended European Search Report dated Nov. 25, 2016, in European Patent Application No. 14797700.3.

* cited by examiner

PNEUMATIC TIRE

TECHNICAL FIELD

The present invention relates to a pneumatic tire provided in the tread portion with a plurality of main grooves which extend continuously in the tire circumferential direction.

BACKGROUND TECHNIQUE

Heretofore, there has been proposed a pneumatic tire employing a tread pattern in which the tread portion is provided with a plurality of main grooves extending continuously in the tire circumferential direction (for example, see Patent Document 1). The tread portion includes a tread rubber formed of a cap rubber layer and a base rubber layer.

In this type of tire, in order to achieve both of rolling performance and wear resistance, the thicknesses of the cap rubber layer and the base rubber layer are controlled.

In recent years, indications of tire performance are put into operation in the marketplace. The tire performance includes, for example, rolling performance, low noise performance, wet performance, wear resistance, etc. The improvement of these properties is strongly desired.

PRIOR ART DOCUMENTS

Patent Document

Patent Document 1: JP 2007-137411

SUMMARY OF THE INVENTION

Problems that the Invention is to Solve

However, in order to improve the low-noise performance, for example, if a shallow main groove whose groove volume is small is provided, the main groove disappears early due to wearing, and the wear resistance and the wet performance tend to deteriorate.

Meanwhile, in order to improve the wear resistance, if voluminous carbon is blended into the tread rubber, there is a tendency that the tread portion becomes liable to generate heat, and the rolling performance is deteriorated.

Thus, each of the above-mentioned performances involves a trade-off relationship. Therefore, it is difficult to provide a tire whose every performance is satisfactory level in the marketplace.

The present invention was made in view of the circumstances as described above, and a primarily object is to provide a pneumatic tire capable of improving the rolling performance, low noise performance and wear resistance with good balance while maintaining the wet performance.

Means for Solving the Problems

The present invention is a pneumatic tire provided in the tread portion with a plurality of main grooves extending continuously in the tire circumferential direction to define a plurality of land portions between the main grooves or between the tread edge and the main groove, and characterized in that at least one of the land portions is provided with sipes extending from the main groove, at least one of the main grooves has, in a cross-section perpendicular to the longitudinal direction of the groove, a first groove bottom and a pair of first groove walls smoothly extending from the first groove bottom to a tread surface, in the tread surface, the groove width W1 between the first groove walls is 2.0 to 20.0 mm, the groove depth D from the tread surface to the first groove bottom is 10.0 mm or more, and in the first groove wall, a ratio (W1/α) of the angle α (degrees) with respect to the normal direction to the tread surface and the groove width W1 (mm) is in a range of 1.0 to 2.0 (mm/degree).

In the pneumatic tire according to the present invention, it is desirable that the main groove extends zigzag in the tire circumferential direction.

In the pneumatic tire according to the present invention, it is desirable that at least one of the land portions is provided with a plurality of lateral grooves across the land portion, the transverse groove has, in a cross section perpendicular to the longitudinal direction of the grooves, a second groove bottom and a pair of second groove walls extending from the second groove bottom to the tread surface, in the tread surface, the groove width W2 between the second groove walls is 1.0 to 12.0 mm, and in the second groove wall, the angle β with respect to the normal direction to the tread surface is 0 to 20 degrees.

In the pneumatic tire according to the present invention, it is desirable that the ratio (W1/α) is in a range of 1.3 to 1.8 (mm/degree).

In the pneumatic tire according to the present invention, it is desirable that the width of the sipe is 0.5 to 1.5 mm.

In the pneumatic tire according to the present invention, it is desirable that the main grooves include a pair of crown main grooves extending on both sides of the tire equator, and a pair of shoulder main grooves extending on the outer sides in the tire axial direction of the crown main grooves, and the groove width W1$s$ of the shoulder main groove is larger than the groove width W1$c$ of the crown main groove.

In the pneumatic tire according to the present invention, it is desirable that the tread portion includes a crown rib which is defined between a pair of the crown main grooves and continuous in the tire circumferential direction, and in the crown rib, the rib edge which is connected to the first groove wall on the tire equator side includes an external corner portion extending along the tire circumferential direction on the most outside in the tire axial direction, and an internal corner portion extending along the tire circumferential direction on the most tire equator side.

In the pneumatic tire according to the present invention, it is desirable that the crown rib includes a plurality of crown sipes communicating between a pair of the crown main grooves, the crown sipes are inclined to one side with respect to the tire axial direction, and include a first crown Sipe connecting between the external corner portions of the rib edges of the crown rib on one side and the other side of the tire equator, and a second crown sipe connecting between the internal corner portions on one side and the other side of the tire equator.

Effect of the Invention

The pneumatic tire of the present invention is provided in at least one of the land portions with the sipes extending from the main groove.

The main groove has, in the cross section perpendicular to the longitudinal direction of the groove, the first groove bottom and a pair of the first groove walls smoothly extending from the first groove bottom to the tread surface.

In the tread, the groove width W1 between the first groove walls is 2.0 to 20.0 mm.

The groove depth D from the tread surface to the first groove bottom is at least 10.0 mm.

In the first groove wall, the ratio (W1/α) of the angle α (degree) with respect to the normal direction to the tread surface and the groove width W1 (mm) is in a range of 1.0 to 2.0 (mm/degree).

In the pneumatic tire of the present invention, the ranges for the groove width W1 and the groove depth D of the main groove are controlled. Further, the range for the angle α of the first groove wall is controlled. Therefore, in the ground contact patch of the tire, it becomes possible that the first groove walls of the main groove contact with each other by the deformation of the tread portion due to the applied load. That is, on the tread surface side, the land portions adjacent to each other through the main groove come into contact with each other and, temporarily, the apparent rigidity of the tread portion is increased.

Thus, after the first groove walls of the main groove are in contact with each other, the deformation of the tread portion is restricted, thereby the energy loss of the tire is reduced, and the rolling performance is improved.

Further, since the rigidity on the tread surface side is increased, the amount of slip against the road surface of the land portion when contacting with the ground is reduced, and the wear resistance is improved.

Furthermore, in the pneumatic tire of the present invention, since the first groove walls contact with each other, the groove volume of the main groove becomes small, and noise such as columnar resonance sound in the main groove is suppressed, thereby the anti-noise performance is improved.

In that case, the groove volume is decreased, and drainage by the main groove tends to be reduced, but the wet performance can be maintained by the edge effect of the sipes provided in the land portion.

MODES FOR CARRYING OUT THE INVENTION

An embodiment of the present invention is described hereinafter with reference to the drawings.

Figure 1:
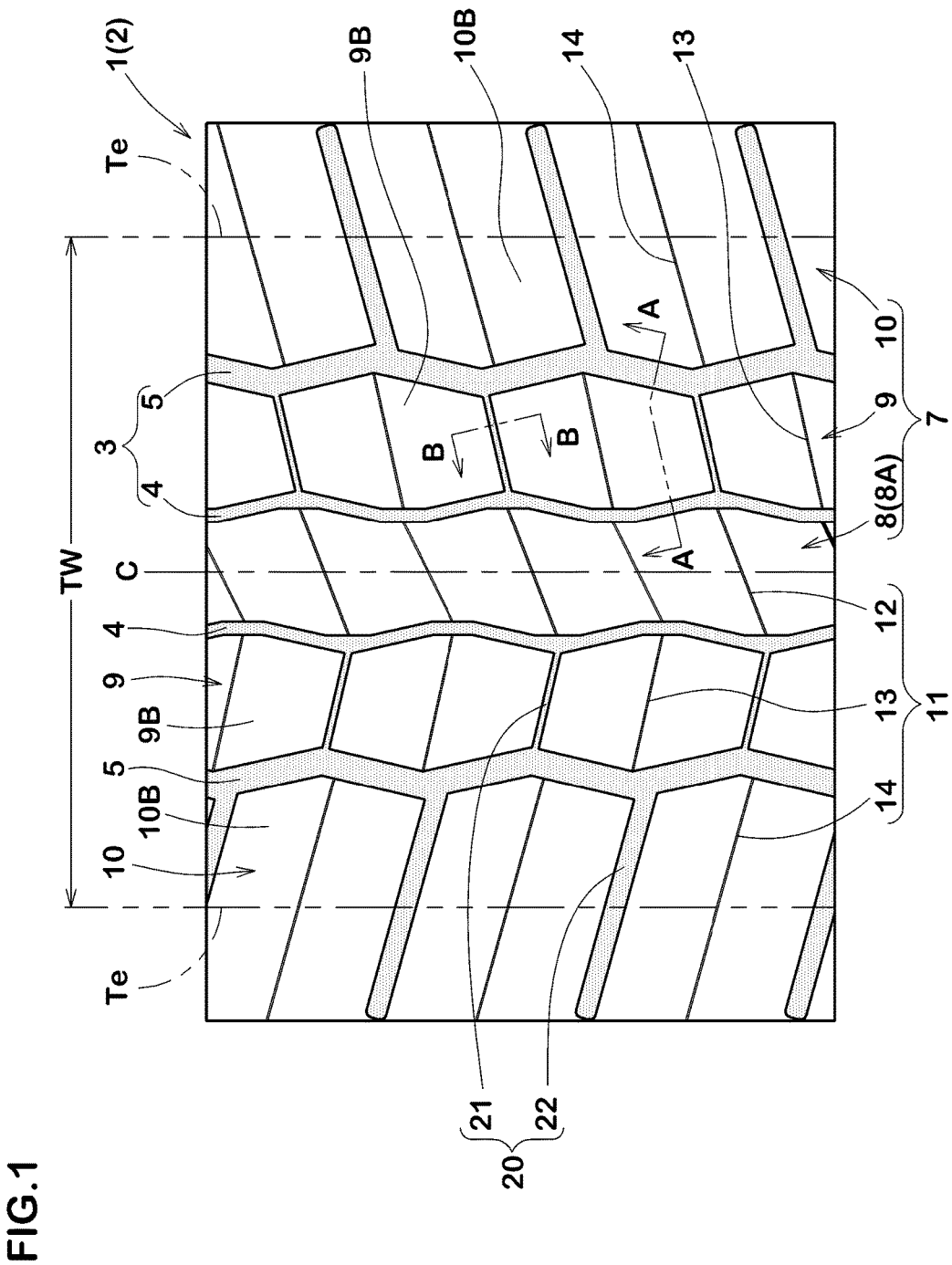
FIG. 1 A development view of a tread portion of a pneumatic tire as an embodiment of the present invention.

In FIG. 1, a developed view of a tread portion 2 of a pneumatic tire (hereinafter sometimes simply described as "tire") 1 is shown.

In this embodiment, a heavy load tire is shown as the tire 1. The tire 1 encompasses a variety of categories such as for passenger cars for example.

As shown in FIG. 1, the tire 1 is provided in the tread portion 2 with a plurality of, in this embodiment four, main grooves 3 extending continuously in the tire circumferential direction.

For example, the main grooves 3 includes a pair of crown main grooves 4, 4 extending on both sides of the tire equator C, and a pair of shoulder main grooves 5, 5 extending on the outer sides in the tire axial direction of the crown main grooves 4.

The tread portion 2 in this embodiment is provided with a plurality of land portions 7 defined between the main grooves 3 or between the main groove 3 and the tread edge Te.

For example, the land portions 7 include a crown land portion 8, a pair of middle land portions 9, 9, and a pair of shoulder land portions 10, 10. The crown land portion 8 is defined between a pair of the crown main grooves 4, 4. The middle land portion 9 is defined between the crown main groove 4 and the shoulder main groove 5. The shoulder land portion 10 is defined between the shoulder main groove 5 and the tread edge Te.

The "tread edge" is the axially outermost edge of the ground contacting patch when the tire 1 in a normal state is loaded with a normal load and contacted with a plane at a camber angle of 0 degree.

The "normal state" is a state of the tire 1 which is mounted on a normal rim (not shown), inflated to a normal inner pressure and loaded with no load.

In this specification, dimensions of respective parts of the tire 1 refer to values under the normal state unless otherwise noted.

The "normal rim" is a rim specified for the tire by a standard included in a standard system on which the tire 1 is based. For example, the normal rim is the "standard rim" in JATMA, the "Design Rim" in TRA, the "Measuring Rim" in ETRTO.

The "normal inner pressure" is the air pressure specified for the tire by a standard included in a standard system on which the tire 1 is based. For example, the normal inner pressure is the "maximum air pressure" in JATMA, the maximum value described in Table "TIRE LOAD LIMITS AT VARIOUS COLD INFLATION PRESSURES" in TRA, the "INFLATION PRESSURE" in ETRTO.

The "normal load" is the load specified for the tire by a standard included in a standard system on which the tire 1 is based. For example, the normal load is the "maximum load capacity" in JATMA, the maximum value listed in Table "TIRE LOAD LIMITS AT VARIOUS COLD INFLATION PRESSURES" in TRA, the "LOAD CAPACITY" in ETRTO.

At least one of the land portion 7 is provided with sipes 11 extending from the main groove 3.

The sipes 11 in this embodiment include, for example, crown sipes 12 disposed in the crown land portion 8, middle sipes 13 disposed in the middle land portion 9, and shoulder sipes 14 disposed in the shoulder land portion 10.

These sipes 11 improve the wet performance of the tire 1 by the wiping effect and edge effect.

For example, the width of the sipe 11 is preferably in a range of 0.5 to 1.5 mm.

If the width of the sipe 11 is less than 0.5 mm, it becomes difficult to form the sipe, and the edge effect may not be sufficiently exhibited. If the width of the sipe 11 is more than 1.5 mm, there is a possibility that the rigidity of the land portion 7 is excessively lowered.

Figure 2:
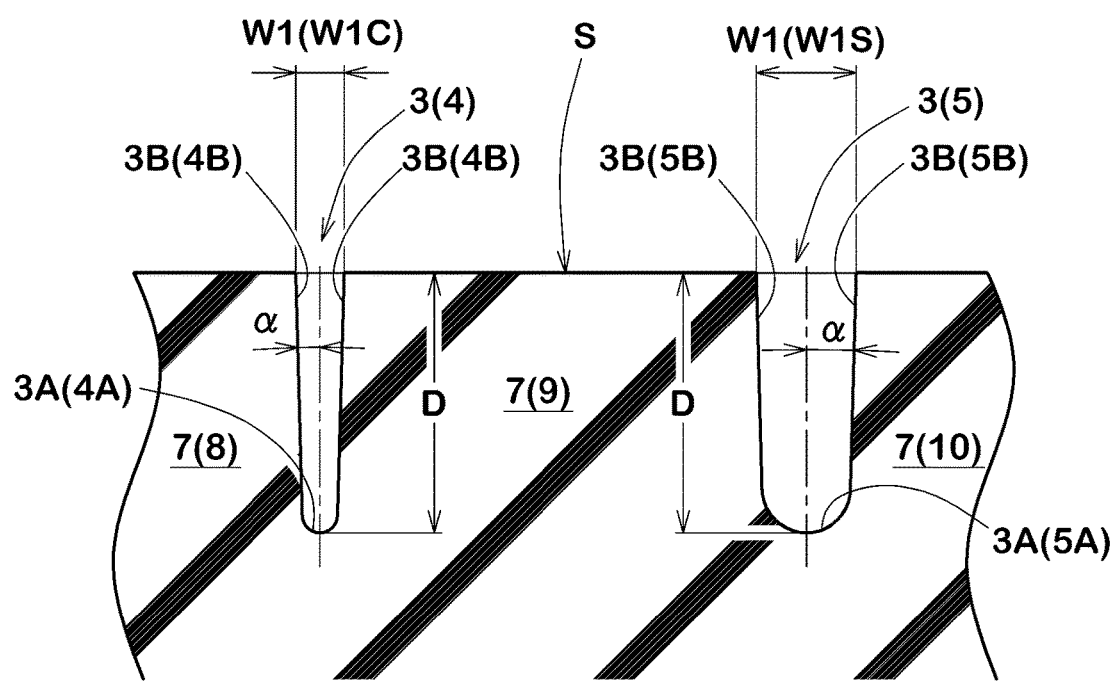
FIG. 2 A-A section of FIG. 1.

In FIG. 2, as the A-A section of FIG. 1, a transverse sectional view of the main groove 3 perpendicular to the longitudinal direction is shown.

As shown in FIG. 2, the main groove 3 has a first groove bottom 3A, and a pair of first groove walls 3B smoothly extending from the first groove bottom 3A to tread surface S. The first groove walls 3B are each inclined to such direction that the groove width gradually increases toward the tread surface S.

In the tread surface S, the groove width W1 of the main groove 3 which is the spacing 3B between the first groove walls 3B is limited in a range of 2.0 to 20.0 mm.

If the groove width W1 is less than 2.0 mm, there is a possibility that the main groove 3 can not secure a sufficient groove volume. If the groove width W1 is more than 20.0 mm, there is a possibility that the rigidity of the land portion 7 is excessively reduced.

The groove depth D of the main groove 3 which is the depth from the tread surface S to the first groove bottom 3A is limited in a range of not less than 10.0 mm.

If the groove depth D is less than 10.0 mm, there is a possibility that the main groove 3 can not secure a sufficient groove volume. From the viewpoint of ensuring the rigidity of the tread portion 2, it is desirable that the groove depth D is 15.0 to 20.0 mm for example.

In the first groove wall 3B, the ratio (W1/α) of the angle α (degree) with respect to the normal direction to the tread surface S and the groove width W1 and (mm) is limited in a range of 1.0 to 2.0 (mm/degree).

Figure 3:
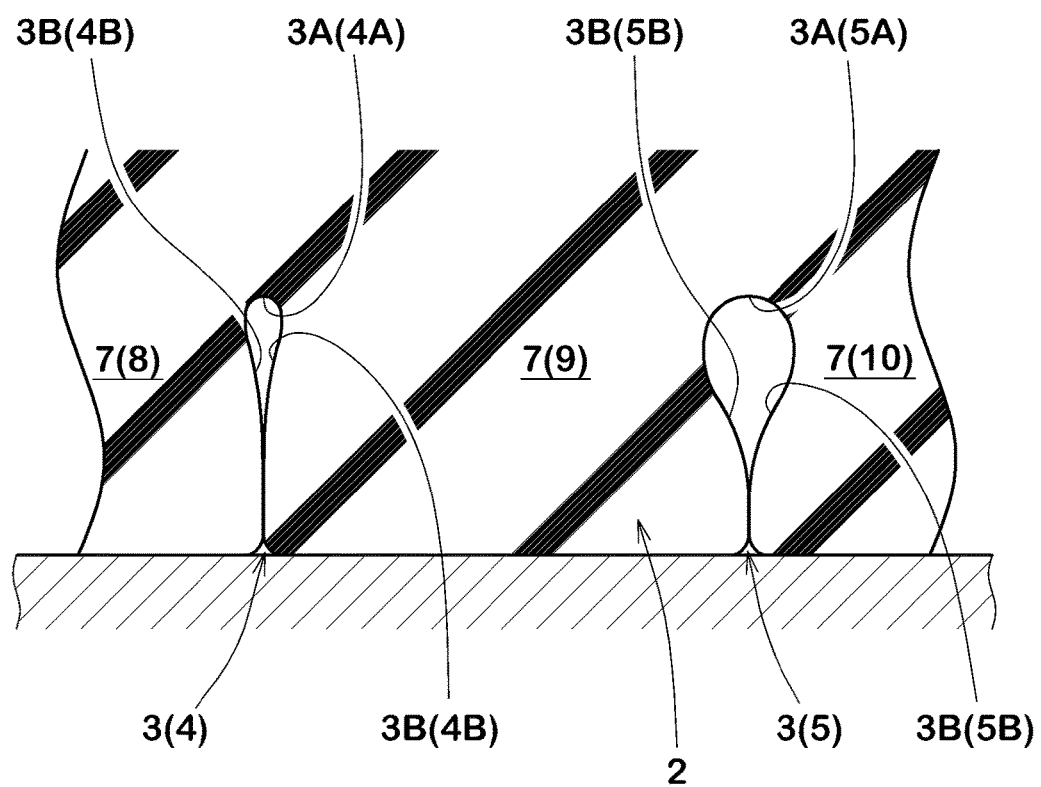
FIG. 3 A partial sectional view of the tread portion for explaining the deformation of the main groove shown in FIG. 2 in the ground contacting patch.

FIG. 3 shows an enlarged partial view of the main groove 3 of the tread portion 2 deformed by being loaded with the normal load.

In the tire 1 in this embodiment, the ranges for the groove width W1 and the groove depth D of the main groove 3 and the ratio (W1/α) of the angle α and the groove width W1 of the first groove walls 3B are limited.

Therefore, as shown in FIG. 3, in the ground contacting patch, due to the deformation of the tread rubber, the first groove walls 3B of the main groove 3 become possible to make contact with each other on the tread surface S side for example. In other words, the land portions 7, which are adjacent to each other through the main groove 3, contact with each other, and deformation of the land portions 7 is restricted.

Thereby, the apparent rigidity of the land portion 7 is temporarily increased.

Accordingly, the energy loss when the tire 1 rolls is reduced, and the rolling performance is improved.

Further, as the rigidity is increased on the tread surface S side, slip of the land portion 7 against the road surface when contacting with the ground is decreased, and the wear resistance can be improved.

In the tire 1 in this embodiment, since the first groove walls 3B are in contact with each other, the groove volume of the main groove 3 becomes small, thereby noise such as columnar resonance sound in the main groove 3 is suppressed, and anti-noise performance is improved.

In that case, there is a tendency that the groove volume decreases and the drainage by the main grooves 3 decreases. However, due to the edge effect of the sipes 11 provided in the land portion 7, the wet performance is maintained.

As shown in FIG. 2, if the ratio (W1/α) of the angle α (degree) with respect to the normal direction to the tread surface S and the groove width W1 (mm) is larger than 2.0 (mm/degree), it is difficult for the first groove walls 3B of the main groove 3 to contact with each other when deformed by being loaded.

If the ratio (mm/degree) is less than 1.0 (mm/degree) on the other hand, there is a possibility that the wet performance is deteriorated and the first groove walls 3B contact too much when deformed by being loaded.

In these cases, there is a possibility that the above functions and effects can not be sufficiently exhibited.

From this viewpoint, the ratio (W1/degree) is more preferably in the range of 1.3 to 1.8 (mm/degree).

The crown main groove 4 in this embodiment has a crown first groove bottom 4A, and a pair of crown first groove walls 4B and 4B smoothly extending from the crown first groove bottom 4A to the tread surface S.

Similarly, the shoulder main grooves 5 has a shoulder first groove bottom 5A, and a pair of shoulder first groove walls 5B and 5B smoothly extending from the shoulder first groove bottom 5A to the tread surface S.

Depending on the profile of the tread surface S, it is desirable that the groove width W1s of the shoulder main groove 5 is greater than the groove width W1c of the crown main groove 4 for example.

Specifically, it is preferable that the groove width W1c of the crown main groove 4 is, for example, 2.0 to 10.0 mm.

On the other hand, it is preferable that the groove width W1s of the shoulder main grooves 5 is, for example, 10.0 to 20.0 mm. According to such configuration of the main grooves 3, the drainage performance varied depending on the contact pressure can be improved in good balance, and the rolling performance, the wear resistance and the anti noise performance can be more effectively exhibited, while maintaining the wet performance, As shown in FIG. 1, for example, the main groove 3 in this embodiment extends zigzag in the tire circumferential direction.

In the zigzag main groove 3, if a pair of the first groove walls 3B come into contact with each other, one of the first groove walls 3B engages with the other first groove wall 3B, and their displacement in the tire circumferential direction can be suppressed. Therefore, the rigidity in a tread surface S side is further improved, and the rolling performance and the wear resistance can be further improved.

At least one of the land portions 7 is provided with a plurality of lateral grooves 20 crossing the land portion 7. In this embodiment, for example, the lateral grooves 20 include a plurality of middle lateral grooves 21 provided in the middle land portion 9, and a plurality of shoulder lateral grooves 22 provided in the shoulder land portion 10.

Each of the middle lateral grooves 21 has one end and the other end which respectively communicate with the crown main groove 4 and the shoulder main groove 5.

The middle lateral grooves 21 divide the middle land portion 9 into a plurality of blocks 9B.

On the other hand, one end of each shoulder lateral groove 22 communicates with the shoulder main grooves 5, and the other end communicates with the tread edge Te.

The shoulder lateral grooves 22 divide the shoulder land portion 10 into a plurality of blocks 10B.

Figure 4:
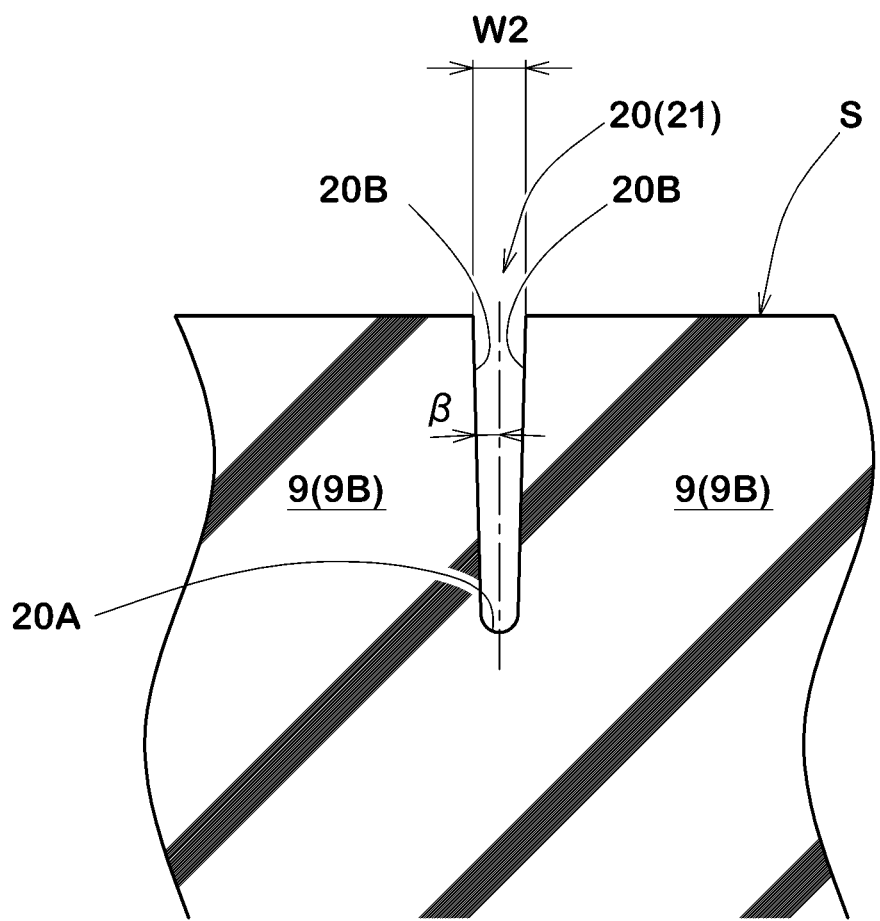
FIG. 4 B-B section of FIG. 1.

In FIG. 4, there is shown a cross-sectional view perpendicular to the longitudinal direction of the transverse grooves 20 as B-B section in FIG. 1.

As shown in FIG. 4, the transverse groove 20 has a second groove bottom 20A, and a pair of second groove walls 20B, 20B extending smoothly from the second groove bottom 20A to the tread surface S, It is desirable that, in the tread surface S, the groove width W2 of the transverse groove 20 which is the spacing between the second groove walls 20B is 1.0 to 12.0 mm for example.

It is desirable from the same viewpoint as the main groove 3 that the angle β of the second groove wall 20B of the lateral groove 20 with respect to the normal direction to the tread surface S is 1 to 12 degrees for example.

In the lateral grooves 20, the ranges for the groove width W2 and the angle β of the second groove wall 20B are respectively limited in the same way as the main groove 3. Therefore, in the ground contacting patch, due to the deformation of the tread rubber, the second groove walls 20B of the transverse groove 20 are possible to make contact with each other in a tread surface S side for example.

That is, the blocks adjacent to each other through the transverse groove 20, in this embodiment, the blocks 9B and 9B or the blocks 10B and 10B, contact with each other. And the deformation of the blocks 9B, 10B are suppressed.

Thus, each block 9B, 10B, consequently each land portion 7 can be temporarily improved in the apparent rigidity, and the rolling performance and wear resistance can be further improved.

From the same viewpoint as the groove width W1 of the main groove 3, it is desirable that the groove width W2 of the middle axial groove 21 is smaller than the groove width of the shoulder lateral groove 22 for example.

Figure 5:
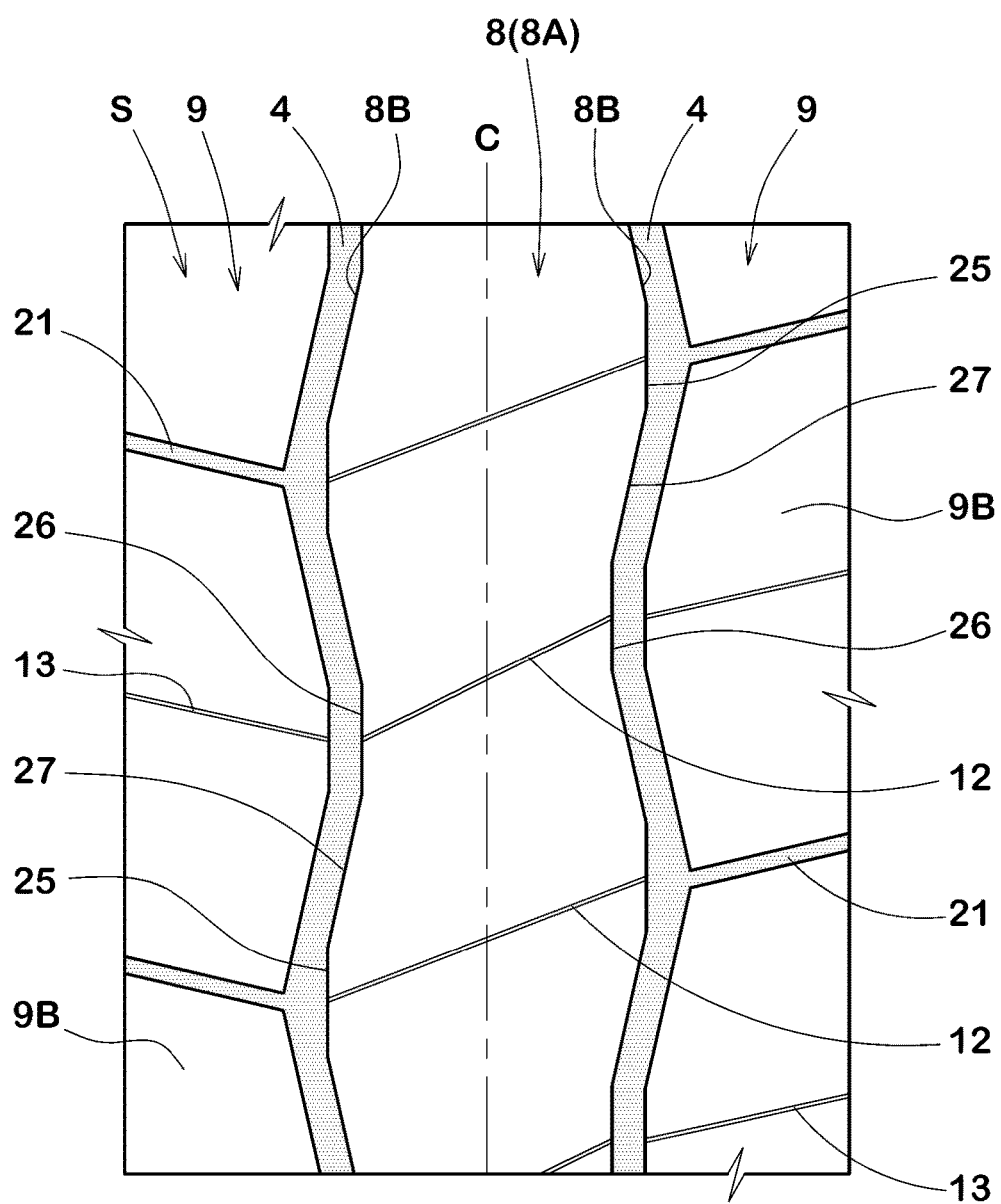
FIG. 5 An enlarged partial view of the vicinity of the tire equator in FIG. 1.

In FIG. 5, there is shown an enlarged partial view of the vicinity of the tire equator C in FIG. 1.

As shown in FIG. 5, the crown land portion 8 in this embodiment is not provided with lateral grooves.

Thus, the crown land portion 8 is a rib-like crown rib 8A which is continuous in the tire circumferential direction.

For example, a rib edge 8B of the crown rib 8A includes an external corner portion 25 extending along the tire circumferential direction on the most outer side in the tire axial direction, an internal corner portion 26 extending along the tire circumferential direction on the most tire equator C side, and an inclined portion 27 connecting therebetween.

The external corner portion 25 and the internal corner portion 26 locally increase the groove width $W1c$ of the crown main groove 4.

When a tread surface S side of the crown main groove 4 is closed, such external corner portion 25 and internal corner portion 26 help to form a drainage channel along the circumferential direction of the tire in a groove bottom 4A side of the crown main groove 4.

Figure 6:
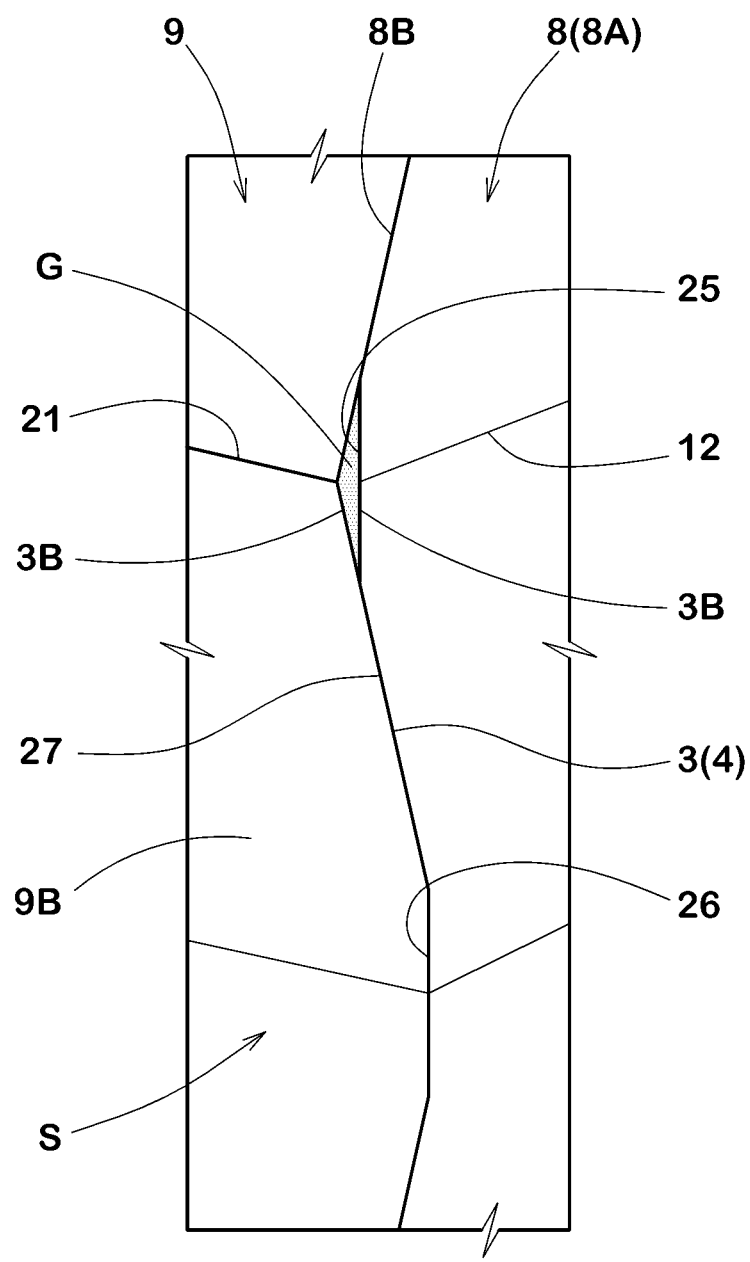
FIG. 6 A partial enlarged view of the vicinity of the closed main groove.

In FIG. 6, there is shown an enlarged partial view of the vicinity of the crown main groove 4 of which the tread surface S side is closed.

As shown in FIG. 6, for example, when the tread surface S side of the crown main groove 4 is closed, the external corner portion 25 forms a gap G between the opposed first groove walls 3B.

The gap G communicates with the ground surface and the drainage on the groove bottom 4A side of the crown main groove 4. Therefore, in a wet road surface, the gap G absorbs water film from the ground surface, and the water film can be drained to the drainage on the groove bottom 4A side to improve the wet performance.

When the first groove walls 3B are in contact with each other, the internal corner portion 26 conforms to the opposite first groove wall 3B.

Similarly, the inclined portion 27 is also conform to the opposite first groove wall 3B.

These internal corner portion 26 and the inclined portion 27 disperse the impact when the first groove walls 3B are in contact with each other.

Thus, for example, in the rib edge 8B of the crown rib 8A, the occurrence of cracks caused by the impact can be suppressed.

A pair of the crown main grooves 4, 4 in this embodiment are arranged so as to be shifted in the tire circumferential direction.

Thus, each external corner portion 25 and each internal corner portion 26 are arranged to be shifted to one side in the tire circumferential direction with the tire equator C interposed therebetween.

In addition, the crown sipes 12 are, for example, extended between the external corner portions 25 on one side and the other side of the tire equator c, and between the internal corner portions 26 on one side and the other side of the tire equator C. Thus, the crown sipes 12 in this embodiment are inclined to one side with respect to the tire axial direction. Such crown sipe 12 can also exert edge effect during turning.

While description has been made as above of one particularly preferable embodiment of the present invention, the present invention can be embodied in various forms without being limited to this embodiment.

Working Examples

Tires (tire size: 315/80R22.5) having the basic pattern shown in FIG. 1 and based on the specifications in Table 1 were experimentally manufactured, and they were tested.

Each test method is as follows.
<Rolling Performance>

The rolling resistance of each test tire was measured by a rolling resistance tester. The detailed conditions are as follows. The result is a reciprocal of the rolling resistance, and indicated by an index based on the value of "Example 1" being 100. The larger the number, the better the rolling performance.

Rim: 22.5×9.00
internal pressure: 850 kPa
vertical load: 33.34 kN
speed: 80 km/h
<Low Noise Performance>

In accordance with the tire alone noise test method prescribed in ECE-R117-02, the pass-by noise level of each test tire when traveling at the center speed of 70 km/h was measured. The result is a reciprocal of the pass-by noise level, and indicated by an index based on the value of "Example 1" being 100. The larger the number, the better the low-noise performance.
<Wear Resistance Performance>

Each test tire was mounted on a test vehicle, and a road test was carried load. And a traveling distance per unit reduction amount of the pattern groove depth (for example, traveling distance in km per reduction of 1 mm) was calculated. Detailed conditions are as follows. The results are shown by an index based on the value of the "Example 1" being 100. The larger the number, the better the wear resistance performance.

Rim: 22.5×9.00
internal pressure: 830 kPa
load: 36.77 kN
road surface: paved road
traveling distance: 100000-300000 km
<Wet Performance>

A test vehicle in which each test tire was mounted on all the wheels was run on a wet road surface at the second gear—1500 rpm fixed, and the time to pass through 10 m was measured from the moment when the clutch was connected. Detailed conditions are as follows. The result is a reciprocal of the time to pass, and indicated by an index based on the value of "Example 1" being 100. The larger the number, the better the wet performance.

Rim: 22.5×9.00
internal pressure: 850 kPa
test vehicle: 10t loading track (2-D vehicles)
load: front half loading
road surface: wet asphalt road with a water film of 5 mm

TABLE 1

| | compara-tive example 1 | compara-tive example 2 | compara-tive example 3 | compara-tive example 4 | compara-tive example 5 | compara-tive example 6 | compara-tive example 7 | working example 1 | working example 2 | working example 3 |
|---|---|---|---|---|---|---|---|---|---|---|
| groove with W1 of main groove (mm) | 1.0 | 21.0 | 13.0 | 13.0 | 13.0 | 13.0 | 13.0 | 13.0 | 2.0 | 20.0 |
| angle α of first groove wall (degree) | 0.7 | 14.0 | 16.3 | 5.9 | 8.7 | 8.7 | 8.7 | 8.7 | 1.3 | 13.3 |
| ratio (W1/α)(mm/degree) | 1.5 | 1.5 | 0.8 | 2.2 | 1.5 | 1.5 | 1.5 | 1.5 | 1.5 | 1.5 |
| groove depth D of main groove (mm) | 15.0 | 15.0 | 15.0 | 15.0 | 9.0 | 15.0 | 15.0 | 15.0 | 15.0 | 15.0 |
| width of sipe (mm) | 1.0 | 1.0 | 1.0 | 1.0 | 1.0 | 0.3 | 1.8 | 1.0 | 1.0 | 1.0 |
| groove width W2 of transverse groove (mm) | 6.0 | 6.0 | 6.0 | 6.0 | 6.0 | 6.0 | 6.0 | 6.0 | 6.0 | 6.0 |
| angle β of second groove wall (degree) | 10 | 10 | 10 | 10 | 10 | 10 | 10 | 10 | 10 | 10 |
| rolling performance (index) [larger is better] | 110 | 80 | 110 | 80 | 110 | 110 | 80 | 100 | 105 | 95 |
| low noise performance (index) [larger is better] | 110 | 80 | 110 | 80 | 110 | 110 | 80 | 100 | 105 | 95 |
| wear resistance performance (index) [larger is better] | 110 | 80 | 110 | 80 | 110 | 110 | 80 | 100 | 105 | 95 |
| wet performance (index) [larger is better] | 80 | 110 | 80 | 110 | 80 | 80 | 100 | 100 | 95 | 105 |

| | working example 4 | working example 5 | working example 6 | working example 7 | working example 8 | working example 9 | working example 10 | working example 11 | working example 12 | working example 13 |
|---|---|---|---|---|---|---|---|---|---|---|
| groove with W1 of main groove (mm) | 13.0 | 13.0 | 13.0 | 13.0 | 13.0 | 13.0 | 13.0 | 13.0 | 13.0 | 13.0 |
| angle α of first groove wall (degree) | 13.0 | 10.4 | 7.3 | 6.5 | 8.7 | 8.7 | 8.7 | 8.7 | 8.7 | 8.7 |
| ratio (W1/α)(mm/degree) | 1.0 | 1.3 | 1.8 | 2.0 | 1.5 | 1.5 | 1.5 | 1.5 | 1.5 | 1.5 |
| groove depth D of main groove (mm) | 15.0 | 15.0 | 15.0 | 15.0 | 15.0 | 15.0 | 15.0 | 15.0 | 15.0 | 15.0 |
| width of sipe (mm) | 1.0 | 1.0 | 1.0 | 1.0 | 0.5 | 1.5 | 1.0 | 1.0 | 1.0 | 1.0 |
| groove width W2 of transverse groove (mm) | 6.0 | 6.0 | 6.0 | 6.0 | 6.0 | 6.0 | 1.0 | 12.0 | 6.0 | 6.0 |
| angle β of second groove wall (degree) | 10 | 10 | 10 | 10 | 10 | 10 | 10 | 10 | 1 | 12 |
| rolling performance (index) [larger is better] | 105 | 103 | 97 | 95 | 105 | 95 | 105 | 95 | 95 | 105 |
| low noise performance (index) [larger is better] | 105 | 103 | 97 | 95 | 105 | 95 | 105 | 95 | 95 | 105 |
| wear resistance performance (index) [larger is better] | 105 | 103 | 97 | 95 | 105 | 95 | 105 | 95 | 95 | 105 |
| wet performance (index) [larger is better] | 95 | 97 | 103 | 105 | 95 | 100 | 95 | 105 | 105 | 95 |

As shown in Table 1, it was confirmed that the tires of working Examples were improved in the rolling performance, low noise performance and wear resistance while maintaining the wet performance.

DESCRIPTION OF THE SIGNS 1 pneumatic tire
2 tread portion
3 main groove
3A first groove bottom
3B first groove wall
7 land portion
11 sipe
S tread
C tire equator

The invention claimed is:
1. A pneumatic tire comprising:
a tread portion provided in its tread surface with a plurality of main grooves extending continuously in the tire circumferential direction to define a plurality of land portions including at least a land portion between the main grooves and a land portion between each tread edge and an adjacent main groove,
wherein
at least one of said land portions is provided with sipes extending from the adjacent main groove,
at least one of said main grooves has, in a cross-section perpendicular to the longitudinal direction of the groove, a first groove bottom and a pair of first groove walls smoothly extending from the first groove bottom to the tread surface, wherein the groove width W1 between the first groove walls is 2.0 to 20.0 mm in the tread surface, and the groove depth D from the tread surface to the first groove bottom is 10.0 mm or more,
wherein
in each said first groove wall, a ratio (W1/α) of the angle α (degrees) of the first groove wall with respect to the normal direction to the tread surface and the groove width W1 (mm) between the first groove walls is in a range of 1.0 to 2.0 (mm/degree),
wherein
the main grooves include a pair of crown main grooves disposed where one is on each side of the tire equator, the land portion between the crown main grooves is formed as a crown rib continuous in the tire circumferential direction, the crown rib has two edges respectively abutting the crown main grooves and each edge comprising external corner portions and internal corner portions, the external corner portions extending along the tire circumferential direction on the most outside in the tire axial direction, and the internal corner portions extending along the tire circumferential direction on the most inside in the tire axial direction, wherein in the external corner portions and the internal corner portions, said two edges extend in parallel with the tire circumferential direction, wherein the crown rib is provided with first crown sipes respectively connecting between the external corner portions of one edge of the crown rib and the external corner portions of the other edge, and second crown sipes respectively connecting between the internal corner portions of one edge of the crown rib and the internal corner portions of the other edge, wherein the first crown sipes and the second crown sipes are straight sipes inclined with respect to the tire axial direction to the same direction, wherein a crown land portion which is said land portion between the crown main grooves is provided with only the first crown sipes and the second crown sipes, a shoulder land portion which is said land portion between each tread edge and the adjacent main groove is provided with said sipes as shoulder sipes and lateral grooves as shoulder lateral grooves, and said plurality of land portions further include a middle land portion formed between the crown land portion and said shoulder land portion and provided with said sipes as middle sipes and lateral grooves as middle lateral grooves.

2. The pneumatic tire according to claim 1, wherein each main groove extends zigzag in the tire circumferential direction.

3. The pneumatic tire according to claim 2, wherein the lateral grooves extend across respective land portions, each lateral groove has, in a cross section perpendicular to the longitudinal direction of the lateral groove, a second groove bottom and a pair of second groove walls extending from the second groove bottom to the tread surface, wherein the groove width W2 between the second groove walls is 1.0 to 12.0 mm in the tread surface, and in each said second groove wall, the angle β of the second groove wall with respect to the normal direction to the tread surface is 0 to 20 degrees.

4. The pneumatic tire according to claim 2, wherein the ratio (W1/α) is in a range of 1.3 to 1.8 (mm/degree).

5. The pneumatic tire according to claim 2, wherein the width of the sipes is 0.5 to 1.5 mm.

6. The pneumatic tire according to claim 2, wherein the main grooves include a pair of axially outermost main grooves as shoulder main grooves on the outer sides in the tire axial direction of the crown main grooves, and the groove width W1S of the shoulder main grooves is larger than the groove width W1C of the crown main grooves.

7. The pneumatic tire according to claim 2, wherein the sipes disposed in all the land portions are straight sipes and all the lateral grooves are straight grooves.

8. The pneumatic tire according to claim 1, wherein the lateral grooves extend across respective land portions, each lateral groove has, in a cross section perpendicular to the longitudinal direction of the lateral groove, a second groove bottom and a pair of second groove walls extending from the second groove bottom to the tread surface, wherein the groove width W2 between the second groove walls is 1.0 to 12.0 mm in the tread surface, and in each said second groove wall, the angle β of the second groove wall with respect to the normal direction to the tread surface is 0 to 20 degrees.

9. The pneumatic tire according to claim 8, wherein the ratio (W1/α) is in a range of 1.3 to 1.8 (mm/degree).

10. The pneumatic tire according to claim 8, wherein the width of the sipes is 0.5 to 1.5 mm.

11. The pneumatic tire according to claim 8, wherein the main grooves include a pair of axially outermost main grooves as shoulder main grooves on the outer sides in the tire axial direction of the crown main grooves, and the groove width W1S of the shoulder main grooves is larger than the groove width W1C of the crown main grooves.

12. The pneumatic tire according to claim 1, wherein the ratio (W1/α) is in a range of 1.3 to 1.8 (mm/degree).

13. The pneumatic tire according to claim 12, wherein the width of the sipes is 0.5 to 1.5 mm.

14. The pneumatic tire according to claim 12, wherein the main grooves include a pair of axially outermost main grooves as shoulder main grooves on the outer sides in the tire axial direction of the crown main grooves, and the groove width W1S of the shoulder main grooves is larger than the groove width W1C of the crown main grooves.

15. The pneumatic tire according to claim 1, wherein the width of the sipes is 0.5 to 1.5 mm.

16. The pneumatic tire according to claim 15, wherein the main grooves include a pair of axially outermost main grooves as shoulder main grooves on the outer sides in the tire axial direction of the crown main grooves, and the groove width W1S of the shoulder main grooves is larger than the groove width W1C of the crown main grooves.

17. The pneumatic tire according to claim 1, wherein the main grooves include a pair of axially outermost main grooves as shoulder main grooves on the outer sides in the tire axial direction of the crown main grooves, and the groove width W1S of the shoulder main grooves is larger than the groove width W1C of the crown main grooves.

* * * * *